June 25, 1963  J. C. WHITING  3,094,969
VISIBLE FILTER CLOGGING INDICATOR
Filed April 11, 1960  3 Sheets-Sheet 1
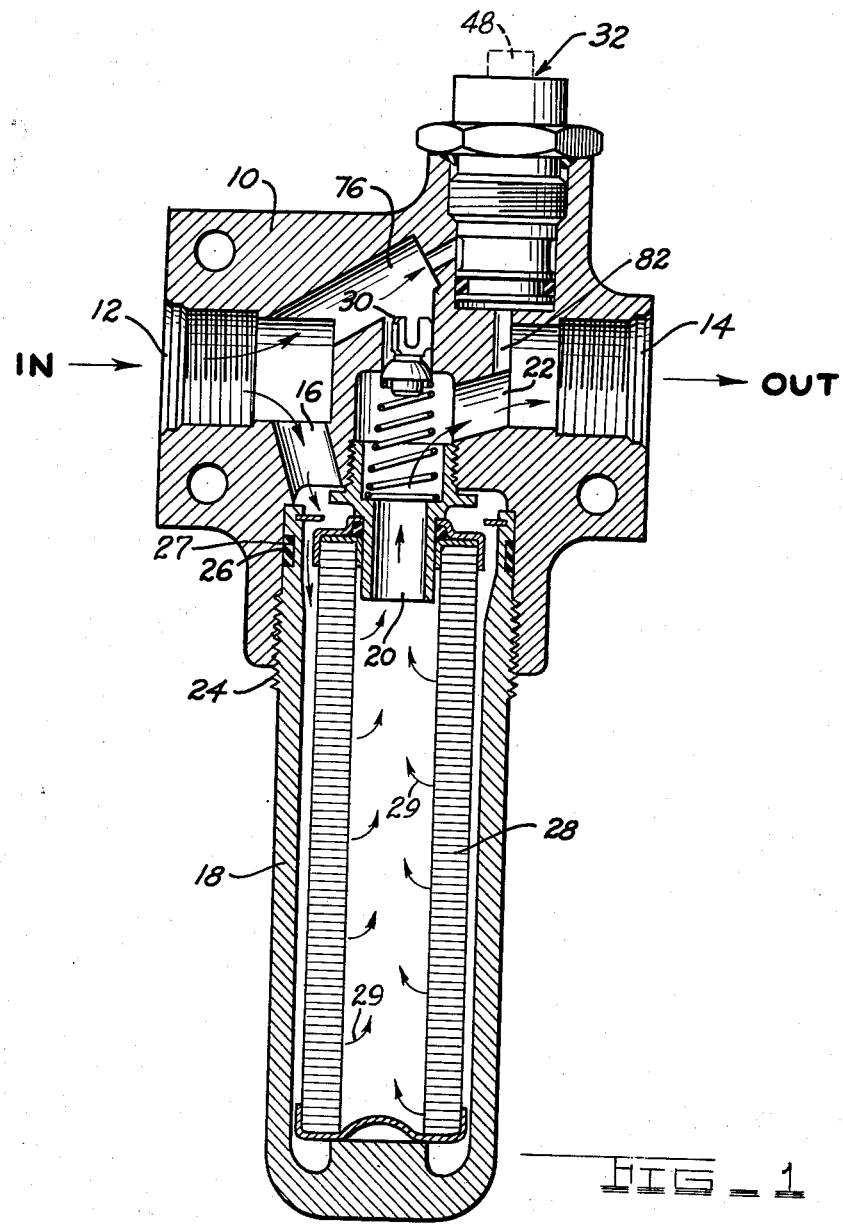
FIG_1
INVENTOR.
JAMES C. WHITING.
BY
William N. Antonio
ATTORNEY.

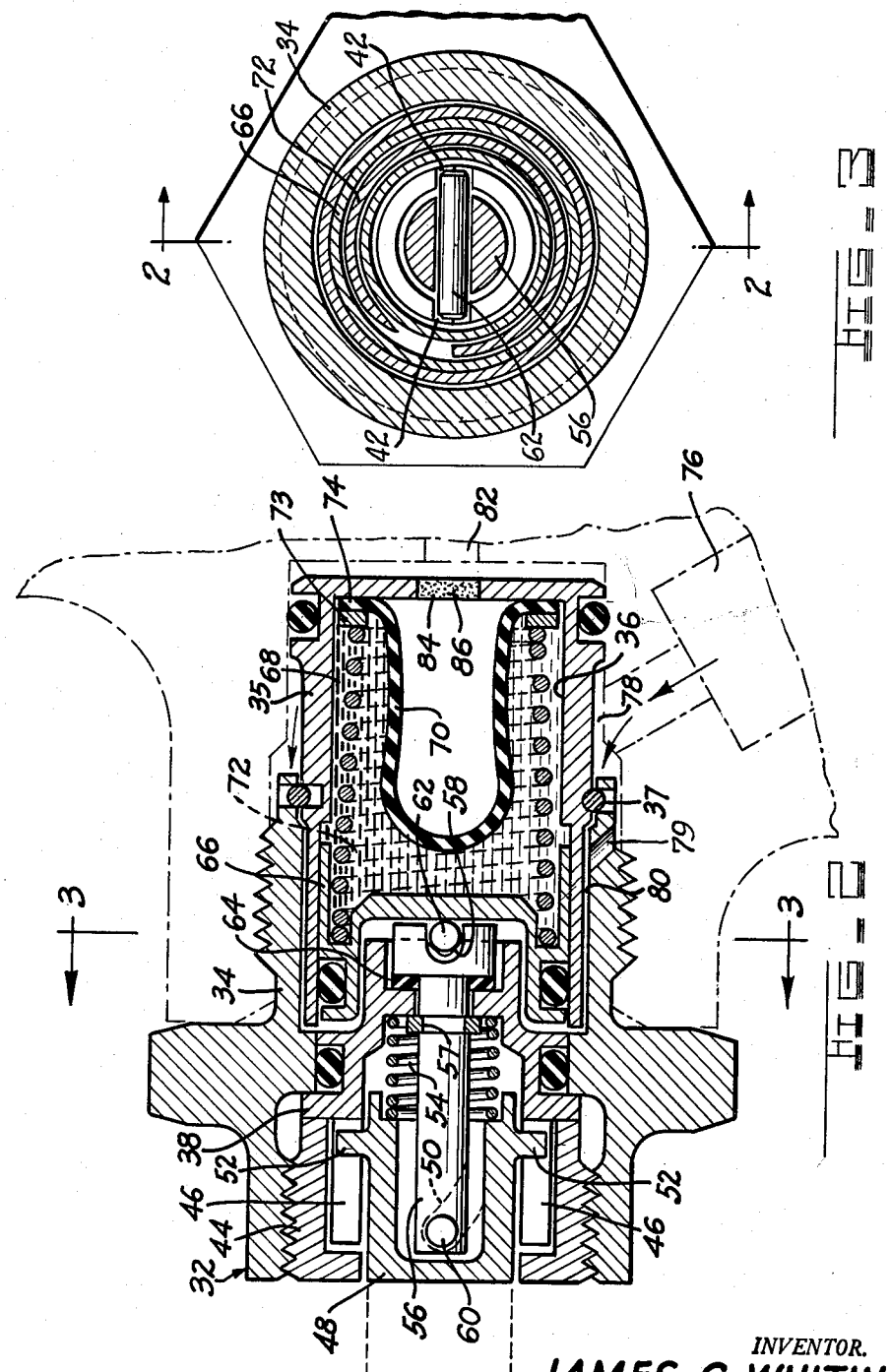

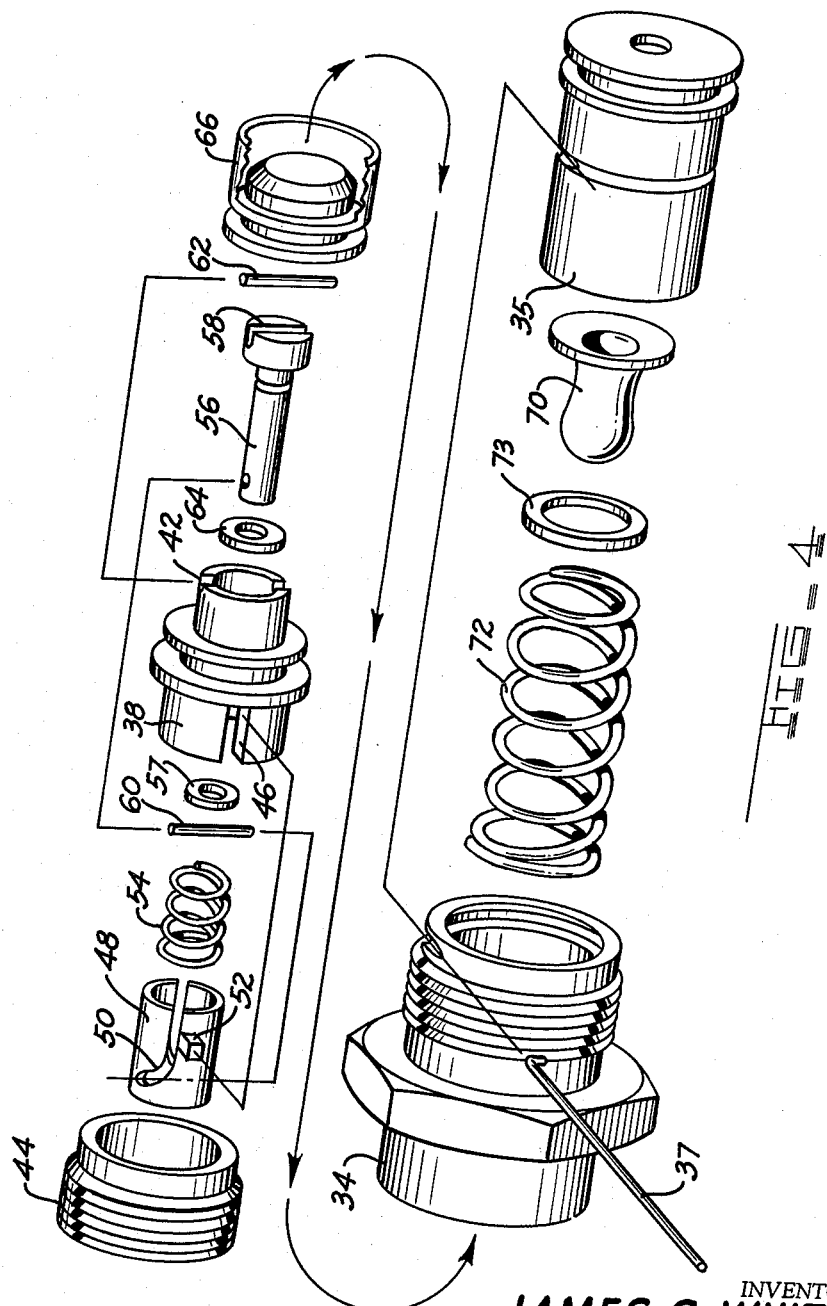

United States Patent Office 3,094,969
Patented June 25, 1963

3,094,969
VISIBLE FILTER CLOGGING INDICATOR
James Clifford Whiting, Madison Heights, Mich., assignor to The Bendix Corporation, a corporation of Delaware
Filed Apr. 11, 1960, Ser. No. 21,409
4 Claims. (Cl. 116—70)

This invention relates to a visible filter clogging indicator and more specifically to improvements in a temperature sensitive differential pressure indicating device.

The use of various types of differential pressure indicating devices which sense changes in pressure drop across a filter element when the element becomes clogged, has been known in the art for money years. One of the faults, however, of many of these devices is that they do not incorporate lock-out devices, which are temperature controlled, for preventing false indicator readins at low temperatures. Such false indicator readings often occur at low temperatures because fluids at these temperatures are normally very viscous and extremely high pressure drops will occur across the filter element, causing the differential pressure indicator to indicate a clogged condition even though the filter element is clean.

Accordingly, it is an object of this invention to provide an improved differential pressure indicating device which will indicate a given differential pressure only at temperatures above a predetermined value.

Another object of this invention is to provide an indicator which will continue to indicate the clogged condition of the filter even after the apparatus with which the filter is associated has ceased to operate.

A further object of this invention is to provide a filter clogging indicator having an improved temperature sensitive locking mechanism which is incorporated into the pressure responsive means to render said means non-responsive at temperatures below a predetermined value.

More particularly it is an object of this invention to provide a temperature controlled differential pressure indicating device of the type in which the temperature control is accomplished through the use of a confined fluid medium which solidifies at temperatures below a predetermined value and prevents movement of the differential pressure sensing means.

A still further object of this invention is to provide a differential pressure indicating device having pressure responsive means which include a differential piston, a flexible bladder forming a chamber therewith, and a fluid medium confined in the chamber for transmitting forces from the bladder to the piston, said fluid medium solidifying at temperatures below a predetermined value to thereby prevent movement of the piston.

Another object of this invention is to provide a temperature controlled pressure responsive means for a differential pressure indicator of the type described in which the number of seals and friction problems are substantially reduced when compared to other devices of this general type.

A further object of this invention is to provide a unique compact temperature sensitive differential pressure indicator which may be easily and inexpensively fabricated.

The above and other objects and features of the invention will become apparent from the following description of the mechanism taken in connection with the accompanying drawings which form a part of this specification and in which:

FIGURE 1 is a sectional view of a filter unit incorporating my visible filter clogging indicator;
FIGURE 2 is an enlarged sectional view of my filter clogging indicator taken along line 2—2 of FIGURE 3 and shown in conjunction with a portion of the filter head;
FIGURE 3 is a sectional view taken along line 3—3 of FIGURE 2; and
FIGURE 4 is an exploded diametric view of the component parts of the filter clogging indicator.

Referring to FIGURE 1, numeral 10 indicates a filter head having an inlet port 12 and an outlet port 14 which communicate with each other via passage 16, fluid bowl 18, and passages 20 and 22 respectively. The bowl is secured in place to the lower side of head 10 by screw threads 24 and is sealed thereto in fluid tight relationship by an O-ring gasket 26 in an annular groove 27. A suitable filter element 28 is disposed in the fluid bowl in such a manner that fluid flowing between the inlet port 12 and outlet port 14 will flow therethrough, as indicated by the arrows 29. A fluted by-pass valve 30 may be provided in the filter head to permit the fluid to pass directly from inlet port 12 to outlet port 14 when the filter element 28 becomes clogged with foreign matter to such an extent that fluid flow therethrough is seriously restricted. Brackets (not shown) may be provided for mounting the device on an engine or other mechanism.

Referring to FIGURES 2, 3 and 4, it will be seen that a temperature sensitive differential pressure indicator assembly 32 is located in filter head 10. However, the indicator, if desired, could be threaded into the end of fluid bowl 18, so as to be located within filter element 28. The indicator assembly includes a two piece housing 34, 35 which is held together by a lock ring 37. Extending through this housing is a bore 36 which contains a cage 38 located at one end thereof, said cage being held in position by a retainer 44 threaded into the housing. The cage is formed with V-notches 42 at one end thereof and axial slots 46 at the other end thereof. A hollow indicator button 48, having helical slots 50 formed in the walls thereof and projections 52 extending therefrom, is located within cage 38 and is urged from a hidden first position (non-signalling position) to a visible second position (signalling position) by a spring 54. The projections extend into slot 46 and prevent the indicator button from rotating within the housing, but permit the indicator to move axially. Located within the hollow indicator button and extending substantially the length of said cage is a shaft 56 which is retained in position by a retaining ring 57. The shaft has a transverse slot 58 formed on one end thereof and a transverse pin 60 extending through the other end thereof. This pin engages the helical slots 50 of the indicator button and prevents axial movement of the indicator to a visible position except when the shaft 56 is permitted to rotate with respect to the indicator button and cage. In order to prevent such rotation of the shaft, a locking pin 62 is position in the transverse slot 58 of the shaft and in notches 42 of the cage. A Teflon bushing 64, which is located between the shaft and the cage, acts as a seal to prevent external leakage and as a low friction bearing surface. Also located in bore 36 and bearing against locking pin 62 is a piston member 66 which forms a chamber 68 with a flexible bladder 70. A coil spring 72, which is located in this chamber, urges the piston member towards the shaft 56 and secures the end of the bladder to the housing by means of back up ring 73 to effectively provide a seal at 74. Confined within chamber 68 is a suitable temperature sensitive fluid medium capable of transmitting forces from the bladder to the piston. Any of a number of fluid mediums may be used in this chamber, so long as the fluid solidifies at temperatures below a given desired value. Selection of the fluid will be dependent on the system pressures and the temperature ranges involved. For normal temperature and pressure ranges the fluid may be plain water or water plus a corrosion inhibitor. Filter inlet pressure is communicated to one side of piston 66 through passage 76, inlet port 78, passage 79 and passage 80, while filter outlet pressure is communicated to one side of bladder 70 through passage 82 and outlet port 84. Located in the outlet port is a porous metal insert 86 for preventing the bladder from being forced therethrough at temperatures which may cause boiling of the fluid confined in chamber 68.

Operation of the indicator is as follows: Flow through the filtering device, as indicated by the arrows 29 in FIGURE 1, is from inlet port 12 through filter element 28 and out through outlet port 14. Filter inlet pressure is communicated to one side of the piston 66 while filter outlet pressure is communicated to the bladder 70. Since chamber 68 contains a fluid medium capable of transmitting forces from the bladder to the piston, it will be understood that the device incorporates in effect a single pressure responsive means consisting of the piston 66, the bladder 70 and the fluid confined therebetween. As long as the differential pressure between the inlet and outlet ports remains below a predetermined value, determined by the spring load of spring 72, the piston 66 will not move. However, when the differential pressure is such that the spring load can be overcome, piston member 66 will move away from locking pin 62 thereby causing the bladder 70 to flex in the direction of the outlet port. Such movement of the piston will permit the locking pin 62 to move out of the V-notches 42 formed on the end of cage 38. It should be noted, however, that the piston need move only far enough to permit the pin 62 to be able to clear the notches 42, at which time spring 54, which is continually urging the indicator button to a visible position, will cause a torsional moment in shaft 56 through means of the helical slot and pin arrangement. Since shaft 56 is now free to rotate, the indicator button will be forced to a visible position thereby indicating that the required pressure differential across the filter element has been reached. When the system has been shut down, the pressure differential across the pressure responsive means will become zero and piston 66 will return to its normal position. The indicator button will remain in its visible position until the filter is serviced and the button is manually reset.

Differential pressures of a magnitude sufficient to overcome the predetermined preload of spring 72 may occur because of a clogged filter condition or may result, for example, from the starting of a cold engine, at which time the flow of oil through the filter is relatively low and the viscosity of the cold oil is very high. In the second instance, although the filter would not be clogged, an indicator means controlled only by differential pressures would have indicated a clogged condition. Accordingly, in order to avoid such false readings, a temperature control is incorporated which will render the differential pressure responsive means inoperative at temperatures below a predetermined value regardless of the magnitude of the differential pressure exerted thereon. In this instance the temperature control consists of the fluid in chamber 68 which will solidify at temperatures below a predetermined value and prevent movement of piston 66. If the piston does not move, the indicator button of course will not be able to move to a visible position. The use of a bladder 70 in the temperature control is an important advantage in that it permits a more compact temperature control configuration while also functioning as a seal at one end of the fluid chamber.

Although this invention has been described in connection with a specific embodiment, it will be obvious to those skilled in the art that various changes may be made in the form, structure and arrangements of parts without departing from the spirit of the invention. Accordingly, applicant does not desire to be limited to the specific embodiment disclosed herein primarily for purposes of illustration, but instead desires protection falling within the scope of the appended claims.

Having thus described the various features of the invention, what I claim as new and desire to secure by Letters Patent is:

1. A temperature sensitive differential pressure indicating device comprising a housing having a bore therein, a cage located in one end of said bore, said cage having a plurality of axial slots formed therein and notches formed on the end thereof, a hollow indicator button slidable within said cage and movable from a hidden first position to a visible second position, said indicator button having helical slots formed in the walls thereof and projections extending therefrom, said projections being located in said axial slots of said cage for preventing relative rotation between said indicator button and said cage, a spring for urging said indicator button from said hidden first position to said visible second position, a shaft located within said indicator button and extending substantially the length of said cage, said shaft having a transverse slot formed on one end thereof and a transverse pin extending through the other end thereof for engagement with the helical slots in said indicator button, said transverse pin thereby preventing movement of said indicator button to a visible position except when said shaft is permitted to rotate with respect to said indicator button and cage, a locking pin located in the transverse slot of said shaft and the notches of said cage for preventing relative rotation between said shaft and said cage, a piston member operatively connected to said locking pin and movable in said bore for permitting egress and ingress of said locking pin from the notches of said cage, a flexible bladder located in said bore, said piston member and bladder forming a chamber therebetween within said bore, spring means located in said chamber for opposing movement of said piston member and securing the end of said bladder to said housing, fluid temperature sensitive means confined in said chamber for transmitting forces from the bladder to the piston member, said fluid means solidifying at temperatures below a predetermined value to thereby prevent movement of said piston, a first port for communicating one side of said piston member with a first pressure, and a second port for communicating one side of said bladder with a second pressure.

2. A temperature sensitive differential pressure indicating device comprising a housing having a chamber therein, a member located in said chamber, said member having a groove formed on the end thereof, an indicator member movable within said chamber from a non-signalling position to a signalling position, said indicator member having a helical slot formed in the wall thereof and means operatively connected to said housing for preventing relative rotation therebetween, means for urging said indicator member from said non-signalling position to said signalling position, a shaft co-axially aligned with said indicator member, said shaft having a groove formed therein and a pin extending therefrom for engagement with the helical slot in said indicator member, said pin thereby preventing movement of said indicator member to a signalling position except when said shaft is permitted to rotate with respect to said indicator member, restraining means located in the grooves of said first mentioned member and said shaft for preventing relative rotation therebetween, a piston member located in said chamber and operatively connected to said restraining means for causing removal thereof from at least one of said grooves to thereby permit relative rotation between said shaft and said indicator member, sealing means located between said piston member and the wall of said chamber, spring means located in said chamber for opposing movement of said piston member, a flexible bladder having the closed end thereof extending within said spring means and the open end thereof secured to said housing housing by said spring means to effectively seal the portion of the chamber enclosed by said piston member and said bladder, a first port communicating with filter inlet pressure, a second port communicating with filter outlet pressure, passage means for communicating one side of said piston member with one of said ports and one side of said bladder with the other of said ports, and fluid temperature sensitive means confined in said chamber between said piston member and said bladder for transmitting forces therebetween, said fluid means solidifying at temperatures below a predetermined value to thereby prevent movement of said piston member.

3. In combination with a filter having a fluid inlet pressure port and a fluid outlet pressure port, a differential pressure indicating device comprising a housing having a chamber therein, an indicator member movable within said chamber from a non-signalling position to a signalling position, means for preventing relative rotation between said indicator member and said housing, means for urging said indicator member from a non-signalling to a signalling position, a shaft-like member coaxially aligned with said indicator member, means operatively connected to said members for permitting movement of said indicator member to a signalling position only upon relative rotation between said members, restraining means for preventing relative rotation between said members, and pressure responsive means movably responsive to a predetermined differential in inlet and outlet pressures and operatively connected to said restraining means for freeing said members from said restraining means to thereby permit movement of said indicator member to a signalling position, said pressure responsive means including piston means located in said chamber and slidable therein, said piston means having one side thereof communicating with one of said pressure ports, flexible bladder means located in said chamber and secured to said housing, said bladder means having one side thereof communicating with the other of said pressure ports, spring means for opposing movement of said piston means, and fluid temperature sensitive means confined in said chamber between said piston means and said bladder means for transmitting forces from the bladder to the piston means, said fluid means solidifying at temperatures below a predetermined value to thereby prevent possible movement of said piston member.

4. A temperature sensitive differential pressure indicator for use with a filter comprising a housing having a chamber therein, indicating means located in said chamber, said indicating means having signalling and non-signalling positions, means located in said chamber for restraining movement of said indicating means from non-signalling to said signalling position, movable pressure responsive means located in said chamber for releasing said indicating means from said restraining means when the differential pressure acting on said pressure responsive means exceeds a predetermined value, said pressure responsive means including a piston member slidable in said chamber and operatively connected to said restraining means, sealing means located between said piston member and the wall of said chamber, spring means located in said chamber for opposing movement of said piston member, a flexible bladder having the closed end thereof extending within said spring means and the open end thereof secured to said housing by said spring means to effectively seal the portion of the chamber enclosed by said piston member and said bladder, a first port communicating with filter inlet pressure, a second port communicating with filter outlet pressure, passage means for communicating one side of said piston member with one of said ports and one side of said bladder with the other of said ports, and fluid temperature sensitive means confined in said chamber between said piston member and said bladder for transmitting forces therebetween, said fluid means solidifying at temperatures below a predetermined value to thereby prevent movement of said piston member.

References Cited in the file of this patent
UNITED STATES PATENTS

| | | |
|---|---|---|
| 2,843,077 | Leefer | July 15, 1958 |
| 2,935,040 | Steensen | May 3, 1960 |
| 3,022,764 | Scavuzzo et al. | Feb. 27, 1962 |